United States Patent
Singh

(10) Patent No.: US 8,031,857 B2
(45) Date of Patent: Oct. 4, 2011

(54) METHODS AND SYSTEMS FOR CHANGING A COMMUNICATION QUALITY OF A COMMUNICATION SESSION BASED ON A MEANING OF SPEECH DATA

(75) Inventor: Mona Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 1323 days.

(21) Appl. No.: 11/612,593

(22) Filed: Dec. 19, 2006

(65) Prior Publication Data

US 2008/0147388 A1 Jun. 19, 2008

(51) Int. Cl.
*H04M 7/00* (2006.01)

(52) U.S. Cl. ............ 379/221.04; 455/452.2; 704/251

(58) Field of Classification Search ............ 455/414.1, 455/422.1, 450, 452.2, 67.11, 67.13; 379/221.01, 379/221.03, 221.04; 704/200.1, 207, 226, 704/231, 251
See application file for complete search history.

(56) References Cited

U.S. PATENT DOCUMENTS

| | | | |
|---|---|---|---|
| 6,275,797 B1 | 8/2001 | Randic | |
| 6,868,080 B1* | 3/2005 | Umansky et al. | 370/354 |
| 7,436,822 B2* | 10/2008 | Lee et al. | 370/356 |
| 7,502,337 B2* | 3/2009 | Kosanovic et al. | 370/286 |
| 7,711,353 B1* | 5/2010 | Satapathy | 455/412.1 |
| 2002/0068568 A1 | 6/2002 | Qing-An | |
| 2002/0128834 A1* | 9/2002 | Fain et al. | 704/246 |
| 2004/0071084 A1* | 4/2004 | El-Hennawey et al. | 370/230 |
| 2004/0184446 A1* | 9/2004 | Havens | 370/352 |
| 2004/0235509 A1* | 11/2004 | Burritt et al. | 455/519 |
| 2004/0247112 A1 | 12/2004 | Lee et al. | |
| 2005/0240411 A1* | 10/2005 | Yacoub | 704/270 |
| 2006/0067329 A1 | 3/2006 | Lee et al. | |
| 2006/0153174 A1* | 7/2006 | Towns-von Stauber et al. | 370/356 |
| 2006/0282264 A1* | 12/2006 | Denny et al. | 704/233 |
| 2007/0127509 A1* | 6/2007 | Lin | 370/401 |
| 2007/0147597 A1* | 6/2007 | Bangor et al. | 379/207.02 |
| 2007/0263775 A1* | 11/2007 | Clark | 379/1.01 |
| 2007/0291693 A1* | 12/2007 | Schultz et al. | 370/331 |
| 2007/0291745 A1* | 12/2007 | Baten et al. | 370/356 |
| 2008/0014883 A1* | 1/2008 | Topaltzas et al. | 455/187.1 |
| 2008/0082341 A1* | 4/2008 | Blair | 704/275 |

OTHER PUBLICATIONS

Hammer, F., et al., "Elements of Interactivity in Telephone Conversations," 8th International Conference on Spoken Language Processing, 2004; 4 pages.

Mohamed, S., et al., "Integrating Networks Measurements and Speech Quality Subjective Scores for Control Purposes," IEEE INFOCOM, 2001; pp. 641-649.

Kang, J., et al., "A Study of Subjective Speech Quality Measurement over VoIP Network," IEEE, 2001; pp. 311-316.

Hammer, F., et al., "The Well Tempered Conversation: Interactivity, Delay, and Perceptual VoIP Quality," IEEE, 2005; pp. 244-249.

"Quality of Service," [online] Wikipedia [retrieved on Nov. 6, 2006]; Retrieved from the Internet: <URL: http://en.wikipedia.org/wiki/Quality_of_service>, 4 pages.

* cited by examiner

*Primary Examiner* — Olisa Anwah

(57) ABSTRACT

Methods and systems are described for changing a communication quality of a communication session based on a meaning of speech data. Speech data exchanged between clients participating in a communication session is parsed. A meaning of the parsed speech data is determined for identifying a service quality indicator for the communication session. An action is performed to change a communication quality of the communication session based on the identified service quality indicator.

27 Claims, 5 Drawing Sheets

METHODS AND SYSTEMS FOR CHANGING A COMMUNICATION QUALITY OF A COMMUNICATION SESSION BASED ON A MEANING OF SPEECH DATA

BACKGROUND

A communication session, such as a phone conversation between two users, is largely dependent on a communication quality of the session. Calls can be disconnected, dropped, etc., if the communication quality is too low and network resources may be used unnecessarily if the communication quality used is higher than needed. Improving communication sessions by changing a communication quality traditionally includes transmission power adjustments, changing bandwidth allocations, handoffs, changing error correction schemes, and other such network-related and/or communication-device-related changes. The communication sessions can involve communication devices, such as traditional phones, mobile phones, or other communication-enabled devices.

Traditionally, the determination as to whether there is a need to change a quality of communication during a communication session is based on measurable network characteristics, such as traffic distribution, bandwidth, and signal quality, and on the capabilities of the communication device. Such techniques do not always provide optimal indicators for determining when there is a need to change communication quality. This is a consequence of ignoring indicators received from the users communicating via the communication session.

More particularly, communication sessions between users can be characterized as a "mouth-to-ear" communication chain with a pair of communication devices and a network interposed between the users in the communication chain. Determinations as to whether there is a need to change a quality of communication during a communication session, however, have largely ignored indicators that are not measured or derived from between the pair of communication devices. Speech-related factors such as the meaning of spoken phrases, repetition, timing, intonation in speech, and other factors are conventionally not used in determinations as to whether there is a need to change a quality of communication during a communication session. As a result, conventional quality change determinations are inherently flawed because they focus on only part of the communication chain while ignoring indications provided by the most important part, the user(s), which may be readily available in the form of speech-related input.

Accordingly, there exists a need for methods, systems, and computer program products for changing a communication quality of a communication session based on a meaning of speech data.

SUMMARY

In an aspect of the subject matter disclosed herein, changing a communication quality of a communication session based on a meaning of speech data includes parsing speech data exchanged between clients participating in a communication session, determining a meaning of the parsed speech data for identifying a service quality indicator for the communication session, and performing an action to change a communication quality of the communication session based on the identified service quality indicator.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

Figure 1:
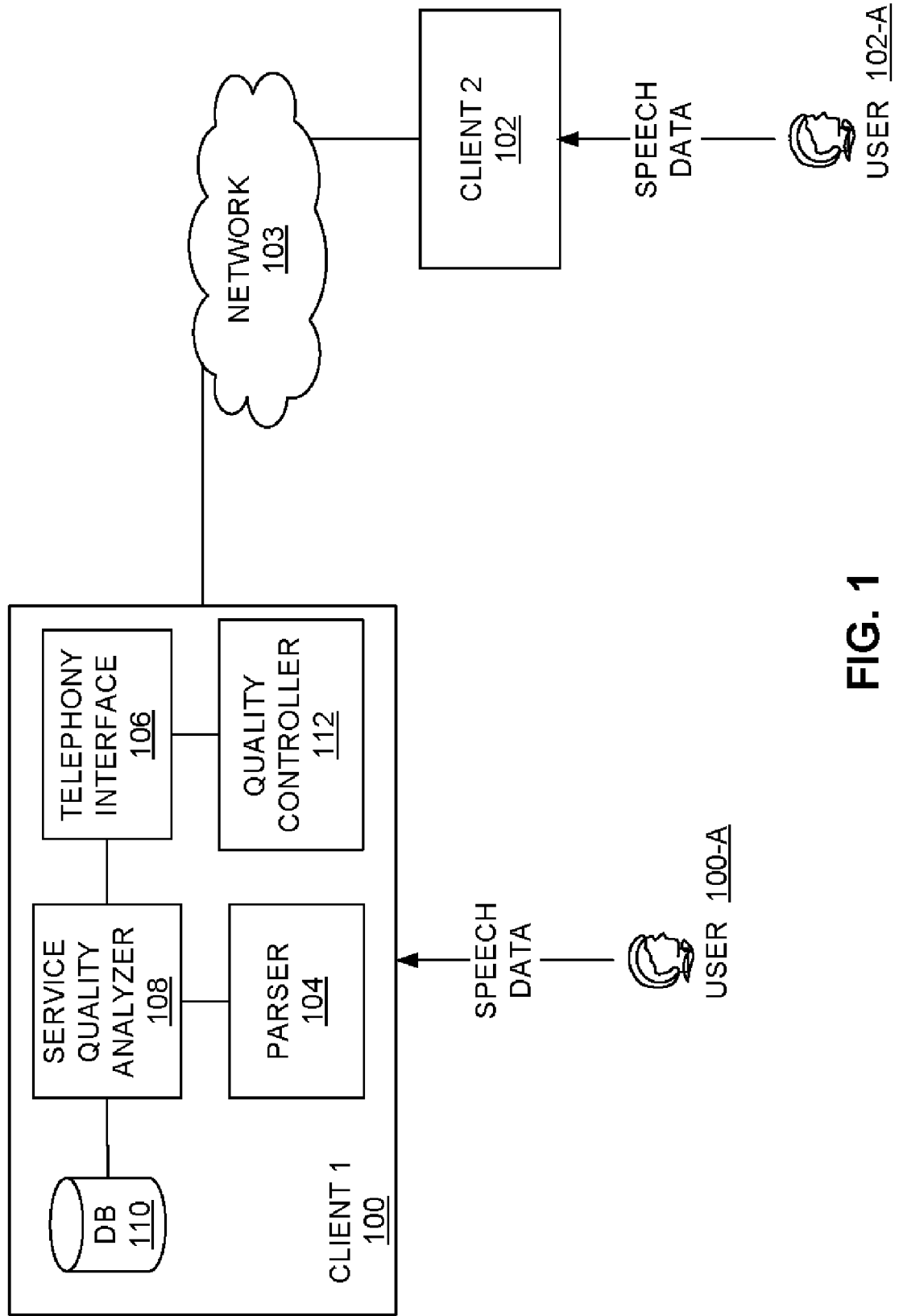
FIG. 1 is a block diagram illustrating an exemplary system for changing a communication quality of a communication session based on a meaning of speech data according to one embodiment of the subject matter described.
Figure 2:
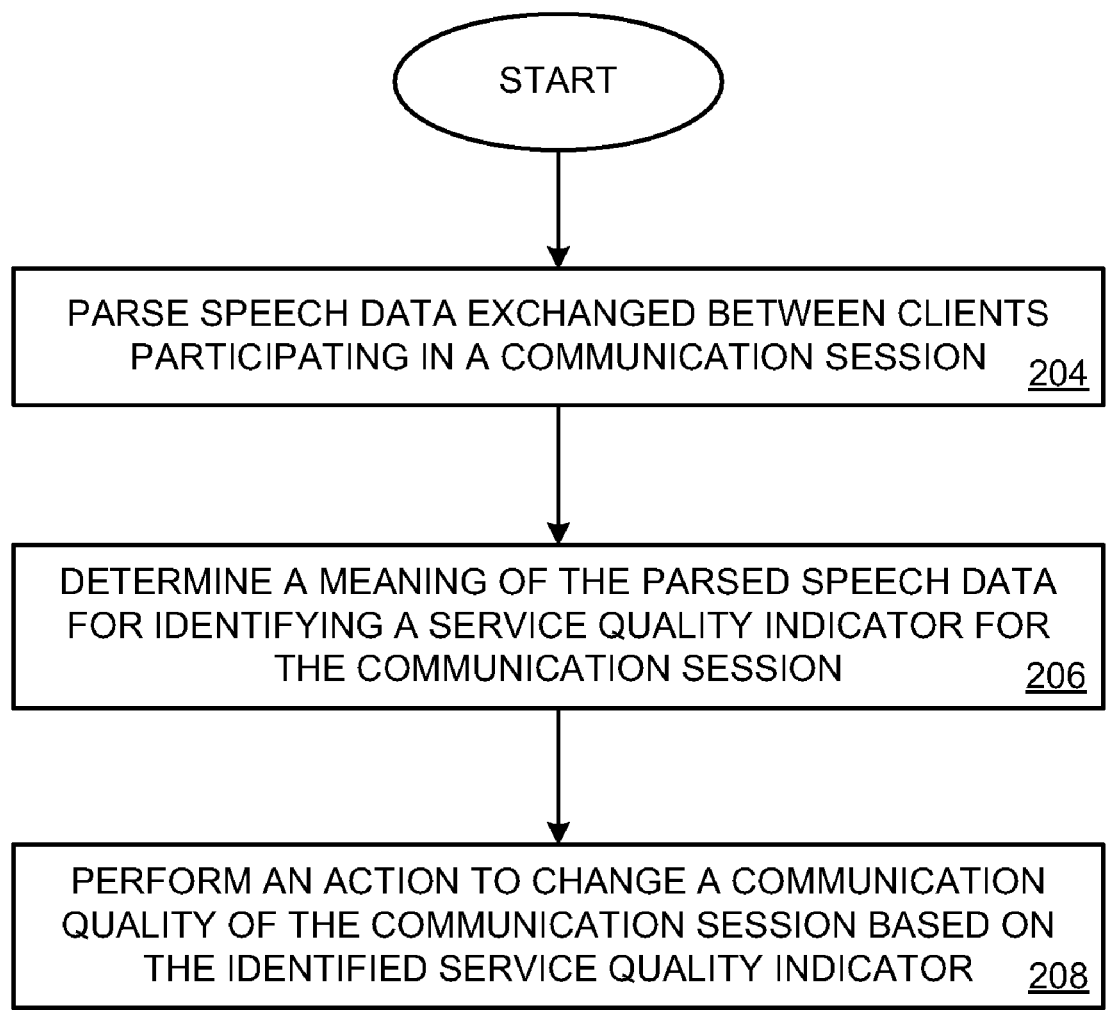
FIG. 2 is a flow diagram illustrating an exemplary method for changing a communication quality of a communication session based on a meaning of speech data according to an aspect of the subject matter described.

FIG. 1 is a block diagram illustrating an exemplary system for changing a communication quality of a communication session based on a meaning of speech data according to one embodiment of the subject matter described. FIG. 2 is a flow diagram illustrating an exemplary method for changing a communication quality of a communication session based on a meaning of speech data according to an aspect of the subject matter described. The method of FIG. 2 may be carried out by, for example, the exemplary system illustrated in FIG. 1.

Illustrated in FIG. 1 are client devices 100 and 102 that are able to establish a communication session via a network 103. As used herein, a communication session is a session carried out by at least two parties where the parties conduct a speech dialogue. An example of a communication session is a phone call between two users. Communication sessions may be carried out between humans via communication devices or between computers using synthetic speech. It is also possible to have a communication session between a human and a machine, such as in user to automated phone attendant systems communication sessions. In FIG. 1, a communication session is carried out between client 100 and client 102 on behalf of user 100-A and user 102-A, respectively. Client 100 and client 102 receive speech data corresponding to speech received from user 100-A and user 102-A, respectively. Clients 100 and 102 may be any combination of hardware and software configured for enabling a communication session, such as a mobile phone, a voice over Internet protocol (VoIP) phone, a public switched telephone network (PSTN) phone, a computer system, and the like.

Referring to FIG. 2, in block 204 speech data exchanged between clients participating in a communication session is parsed. Accordingly, a system for changing a communication quality of a communication session based on a meaning of speech data includes means for parsing speech data exchanged between clients participating in a communication session. For example, in FIG. 1, client 100 includes a parser component 104 for parsing speech data exchanged between clients participating in a communication session.

Figure 3:
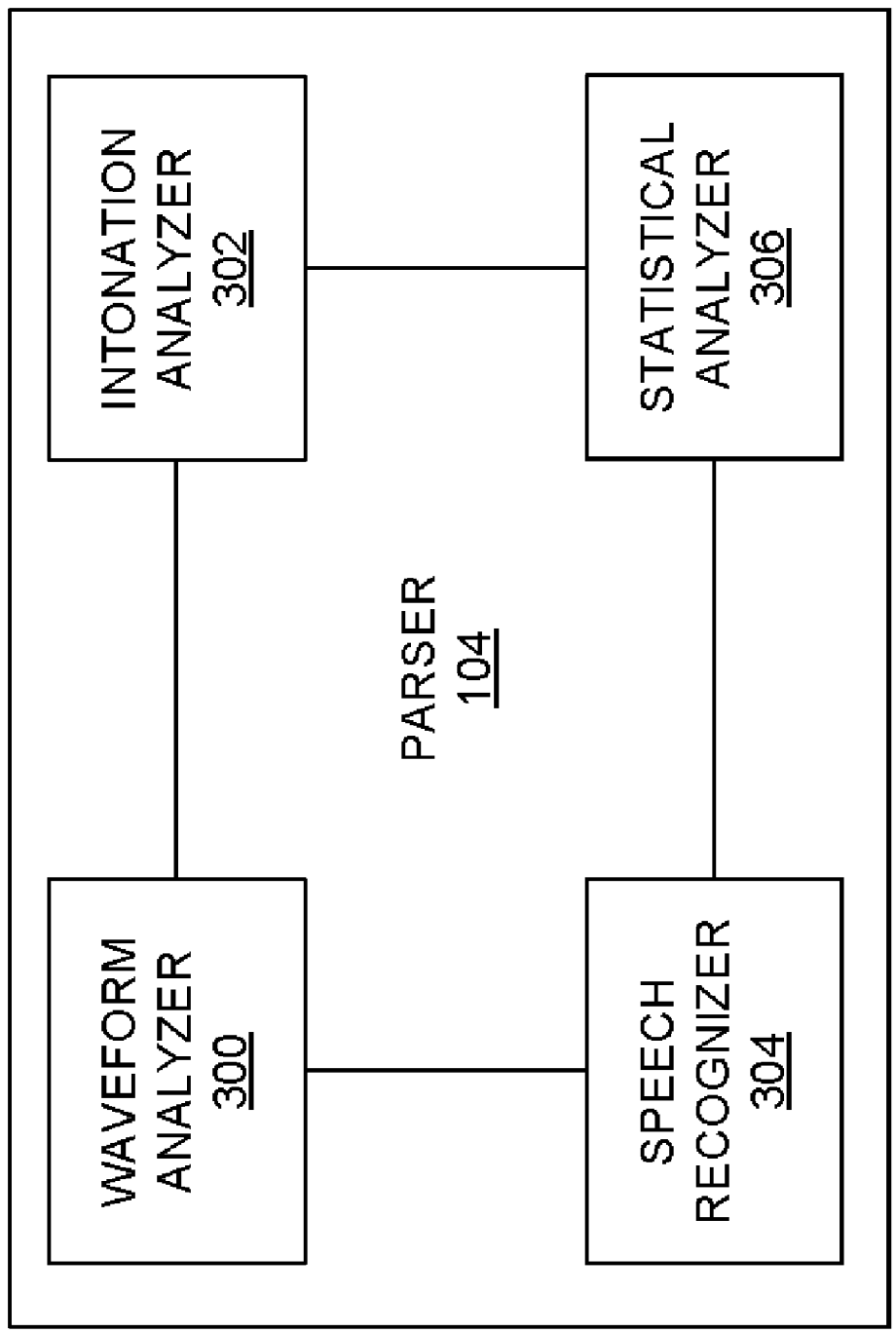
FIG. 3 is a block diagram illustrating an exemplary parser component.

Referring also to FIG. 3, parser component 104 can include a waveform analyzer component 300 configured for converting a waveform representing the speech data into a spectrogram for analysis. For example, analysis can be performed on the raw speech data at the acoustic level with the output being a spectrogram on which statistical analysis may be performed.

Parser component 104 can also include an intonation analyzer component 302 configured for analyzing the spectrogram to determine an intonation value of the speech data. A large portion of the meaning of an utterance is encoded in the intonation of the utterance. Typically, intonation is captured by the acoustic features of duration and the intensity of the utterance. The intonation analyzer component 302 can receive the output from the waveform analyzer component 300 and determine an intonation value for speech data. The intonation value may be classified as rising, falling, or neutral. The intensity of the intonation may be classified as low, medium, or high. The duration of the intonation may be classified as short or long.

Parser component 104 can also include a speech recognizer component 304 configured for performing speech recognition on the speech data by recognizing the speech data received from user 100-A. Speech recognition is well known in the art. Several commercial products are available that can perform speech recognition. One example of a speech recognition engine is Dragon Naturally Speaking® available from Nuance®. Adaptations of such speech recognition systems may be used that allow limited vocabulary speech recognition on handheld devices such as cell phones and VoIP phones.

Parser component 104 can also include a statistical analyzer component 306 configured for performing statistical analysis on the speech data. Statistical analyzer component 306 can be configured to perform noise level analysis, a transmission delay determination, and/or a conversational analysis, and can produce a variety of results based on the analysis that it performs. For example, statistical analyzer component 306 may conduct a conversational analysis and identify conversational events in the communication session, such as double talk, mutual silence, an interruption, and the like.

In one aspect, statistical analyzer component 306 can determine there is double talk, i.e., where both parties are talking at the same time, based on, for example, detecting a temporal interval when speech data is present from both users. The double talk determination may take into account the fact that the tail end of one user's speech may overlap with the beginning of another user's speech. The detection of double talk, alone can be used to determine a communication quality. Detected double talk can also be analyzed with intonation patterns and/or recognized speech to determine a communication quality.

In another aspect, statistical analyzer component 306 can determine there is mutual silence, i.e., where both users produce no speech data, based on, for example, detecting a temporal interval when neither of the users is talking. The presence and length of mutual silence can be used to determine communication quality because natural speech over communication devices should not contain prolonged periods of mutual silence. The detection of mutual silence alone can be used to determine a communication quality. Detected mutual silence can also be analyzed with intonation patterns and/or recognized speech from other temporal intervals to determine a communication quality.

In another aspect, statistical analyzer component 306 can determine there is an interruption (also referred to as a talk spurt), i.e., where one user talks over another user's conversation, based on, for example, detecting a temporal overlap in speech. This can be distinguished from double talk because the interrupter's speech begins during the speech of the other speaker and ends while the other user is still speaking. The detection of an interruption alone can be used to determine a communication quality. A detected interruption can also be analyzed with intonation patterns and/or recognized speech from other temporal intervals to determine a communication quality. For example, if a user interrupts another user's speech with the words "I can't hear you" in a rising intonation then the communication quality can be determined to be degraded.

Network 103 may vary depending upon the communication infrastructure. In a VoIP infrastructure, network 103 includes call managers and the IP infrastructure, while in a mobile environment the network includes the cellular infrastructure. The internal components of network 103 provide the means for transporting data for the communication session from client 100 to client 102.

In one embodiment, not all speech data is parsed. Instead, speech data is parsed at key points during the communication session. For example, speech data can be parsed at the beginning of a communication sessions when a user's speech tends to provide the maximal clues that can help determine the communication quality. A user 100-A is most likely to enunciate words that indicate the quality of a communication session at the beginning of the communication session. Speech data can be parsed periodically, for example every two minutes for ten seconds. Speech data can be parsed following routing events such as a handoff. Such events tend to introduce factors that may affect communication quality for a communication session.

According to another embodiment, parsing may be performed on all the speech data that has occurred to the present time during a communication session. This requires greater processing power but the results of the parsing are likely to be more reflective of the overall communication quality of the communication session.

In an exemplary embodiment, the parsing of the speech data is done by the parser component 104. The speech data is first input to the waveform analyzer component 300, where it is converted to a machine-readable format. The output from the waveform analyzer is then provided to the statistical analyzer component 306 and the intonation analyzer component 302. Based on the results of the waveform analysis and the statistical analysis, further action may be taken. Speech recognition may then be performed at the speech recognizer component 304 based on the results. In example, a poor score on a statistical quality of speech measurement can trigger speech recognition. For example, signal-to-noise ratio (SNR) is an objective statistical measure of speech quality where the difference in speech quality of a speech sample is compared with an original sample. Upon detection of a poor score for SNR, the system may initiate speech recognizer component 304. Also, conversational behavior characteristics that are measured by waveform analyzer component 300 can initiate speech recognition, such as: double-talk, where both parties start talking at the same time; interruption, where one party interrupts the other party; talk after silence, where one of the parties starts talking after mutual silence or at the end of another party's talk spurt; rising intonation during a conversation; and a high intensity of speech data.

The final result of the parsing of speech data in step 204 can be a set of output terms representing, for example, the result of the statistical analysis, the intonation analysis, and the speech recognition. An example data output of the parser component 104 may be:

Measurement key point: after handoff
Intonation: rising, high intensity, long duration
Statistical analysis: Interruption
Recognized speech: "Can you hear me?"

Returning to FIG. 1, client 100 also includes a telephony interface component 106, a service quality analyzer component 108, data storage component 110, and a quality controller component 112. The data storage component 110 can store patterns that correspond to service quality indicators. The telephony interface component 106 interfaces to the network 103 to establish and maintain communication during the communication session. For example, in a VoIP network, telephony interface 106 may interact with a call manager that does the routing of the speech data. In a cellular environment, telephony interface 106 may communicate with a base station. The quality controller component 112 assists the telephony interface component 106 with respect to the quality of the communication. In one embodiment, the telephony interface component 106 is embodied in the quality controller component 112. These components are discussed further below.

Returning to FIG. 2, in block 206 a meaning of the parsed speech data is determined for identifying a service quality indicator for the communication session. Accordingly, a system for changing a communication quality of a communication session based on a meaning of speech data includes means for determining a meaning of the parsed speech data for identifying a service quality indicator for the communication session. For example, the service quality analyzer component 108 illustrated in FIG. 1 is configured for determining a meaning of the parsed speech data for identifying a service quality indicator for the communication session. According to one embodiment, the service quality analyzer component 108 can be configured to determine a meaning of the parsed speech data for identifying a service quality indicator for the communication session by identifying a phrase from recognized speech. Such phrases can include, for example, "hello", "huh", "can't hear you", "can you hear me?", "are you there?", and the like.

According to another embodiment, the service quality analyzer component 108 can be configured to determine a meaning of the parsed speech data by additionally determining a context for the identified phrase based on at least one of a determination of a measurement key point, a statistical analysis performed on the speech data, and a determined intonation value for the speech data. As will be further described below, the service quality analyzer component 108 can use, for example, a lookup table or a decision tree to identify a service quality indicator corresponding to the determined meaning of the parsed speech data.

The service quality indicator is a "mouth-to-ear" quality indicator. Accordingly, the service quality indicator is more subjective and comprehensive, since it can encapsulate the individual circumstances of both the speaker and the listener. The perceived quality may depend upon the mood, interest, physiology, and environment of both the listener and the speaker. This mouth-to-ear quality approach provides a good indicator of the entire communication chain. Speech-related factors such as the meaning of spoken phrases, repetition, timing, intonation in speech, and other factors can be used in determinations as to whether there is a need to change a quality of communication during a communication session. Other factors such as a user's hearing, background noise, the importance of a conversation, the criticality of making discussion points or instructions crystal clear, a user's distraction level, whether a user is chewing food, and the like, can also be taken into account or are indirectly represented by the other factors.

The service quality indicator can be represented using a standard measure of quality. For example, the scales recommended by the International Telecommunications Union (ITU) can be used to represent the service quality. The ITU recommended quality scales are shown in Tables 1 and 2 below:

TABLE 1

Listening Quality Scale

| Quality of the speech/connection | Score |
|---|---|
| Excellent | 5 |
| Good | 4 |
| Fair | 3 |
| Poor | 2 |
| Bad | 1 |

TABLE 2

Listening Effort Scale

| Effort required to understand the meaning of sentences | Score |
|---|---|
| Complete relaxation possible; no effort required | 5 |
| Attention necessary, no appreciable effort required | 4 |
| Moderate effort required | 3 |
| Considerable effort required | 2 |
| No meaning understood with any feasible effort | 1 |

In an exemplary embodiment, a service quality indicator can be represented similar to the ITU recommended scales using a score based on a speaker quality scale and/or a speaking effort scale as shown in Tables 3 and 4 below.

TABLE 3

The Speaking Quality Scale

| Quality of the speech/connection | Score |
|---|---|
| Excellent | 5 |
| Good | 4 |
| Fair | 3 |
| Poor | 2 |
| Bad | 1 |

TABLE 4

Speaking Effort Scale

| Effort required to understand the meaning of sentences | Score |
|---|---|
| Complete relaxation possible; no effort required in speaking | 5 |
| Attention and accentuation necessary, no appreciable effort required | 4 |
| Moderate effort required in speaking | 3 |
| Considerable effort required in speaking | 2 |
| No meaning understood with any feasible effort in speaking | 1 |

Service quality analyzer component 108 receives the parsed speech data from parser component 104 and is configured to identify service quality indicators based on the determined meaning of the parsed speech data. In one exemplary embodiment, service quality analyzer component 108 uses a lookup table represented by Table 5 below. The data store component 110 stores values corresponding to determined meanings of parsed speech data and corresponding service quality indicators. Although Table 5 illustrates four columns representing four inputs that can be used to identify a service quality indication, it will be understood that any one or more of these inputs may be used without the other inputs for determining the service quality indication. The four inputs illustrated represent recognized speech, measurement key point, statistical analysis, and intonation, each of which, alone or in combination, are representative of the meaning of the parsed speech data. That is, determining any one or more of these inputs will result in determining a meaning of the parsed speech data, which can be used in Table 5 to identify the service quality indication. Of course the columns in Table 5 illustrate some representative meanings for parsed speech data and are not intended to be limited in this respect.

The meaning of the parsed speech data is therefore determined by the service quality analyzer component 108 in conjunction with the parser component 104 using any of the components of the parser component 104. For example, a phrase recognized by speech recognizer component 304 can be used for determining a spoken phrase and correlating it to an entry in the recognized speech column. The statistical analyzer component 306 can be used for determining, based on statistical analysis, whether an interruption, doubletalk, speaking out of turn, etc., has occurred, and such speech can be correlated to an entry in the statistical analysis column. The intonation analyzer component 302 can be used to determine and intonation of the speech data, which can be correlated to an entry in the intonation column. Also, the service quality analyzer component 108 can determine measurement key points, such as after handoff, the beginning of a communication session, and during a communication session, which can be correlated to an entry in the measurement key point column.

Based on a comparison of the determined meaning of the parsed speech data and data store component in the data store component 110 represented by Table 5, the service quality analyzer component 108 can determine a service quality indication.

TABLE 5

Service Quality Indicators

| Recognized speech | Measurement key point | Statistical analysis | Intonation | Service Quality Indication |
|---|---|---|---|---|
| "Can you hear me?" | After handoff | Interruption | Rising, high intensity, long duration | Speaking effort: 2 Speaking quality: 2 |
| "What did you say?"/"Could you repeat that?" | After handoff | Interruption | Low intensity | Listening effort: 3 |
| "I can't hear you" | Beginning of communication session | Double-talk | Rising, high intensity | Listening effort: 2 |
| "Hello, the connection is very clear" | During communication session | Normal conversation | Within normal parameters | Speaking effort: 5 |

Figure 4:
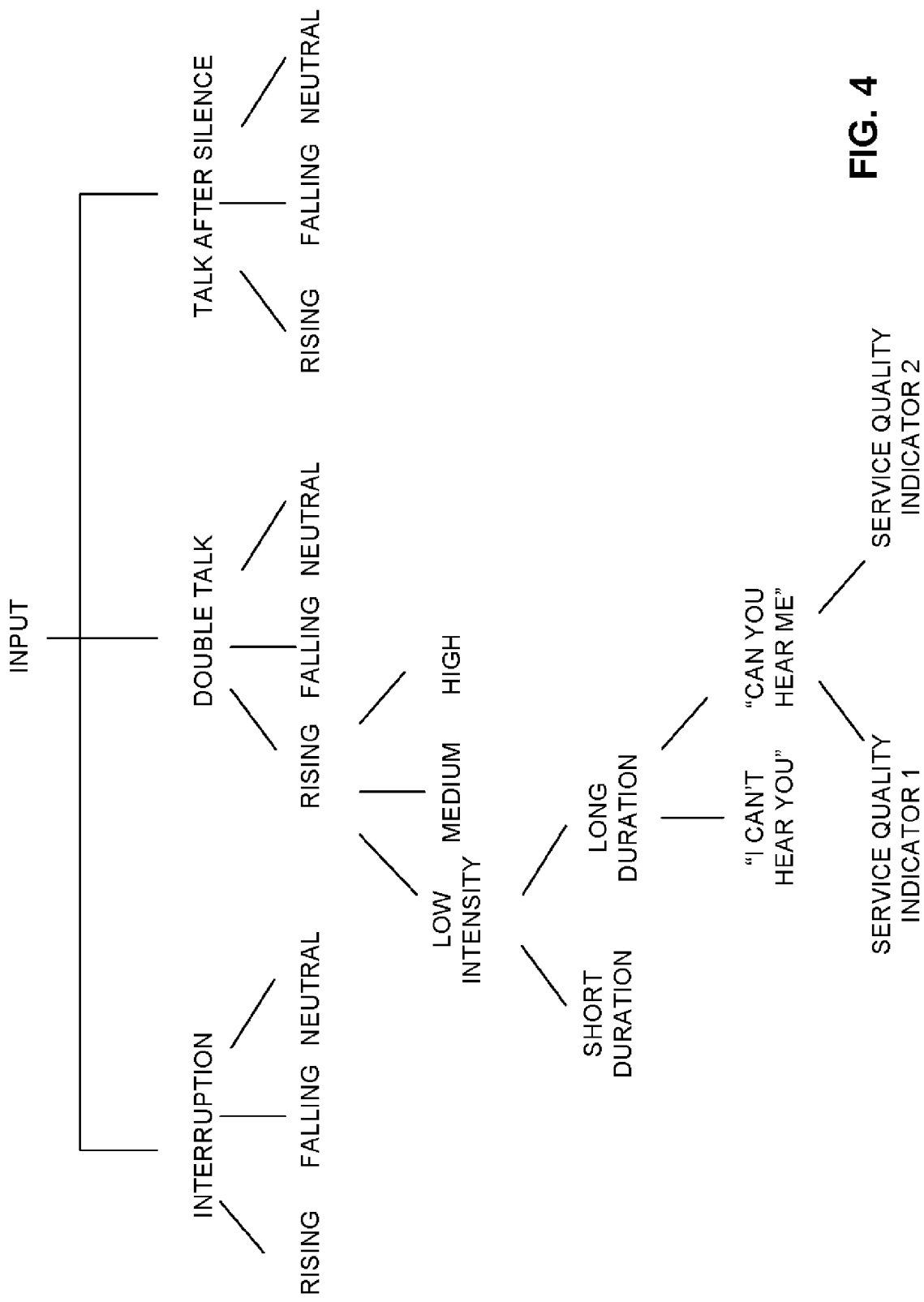
FIG. 4 illustrates a decision tree for identifying a service quality indicator.

In an alternative embodiment, the service quality analyzer component 108 may be configured to use a decision tree algorithm for identifying a service quality indication. One example of a suitable decision tree that contains similar input factors as those in Table 5 is illustrated in FIG. 4.

Returning again to FIG. 2, in block 208 an action is performed to change a communication quality of the communication session based on the identified service quality indicator. Accordingly, a system for changing a communication quality of a communication session based on a meaning of speech data includes means for performing an action to change a communication quality of the communication session based on the identified service quality indicator. For example, the quality controller component 112 illustrated in FIG. 1 is configured for performing an action to change a communication quality of the communication session based on the identified service quality indicator. In general, a lower service quality indication (e.g., 1, 2, or 3) can indicate that communication quality of the communication session should be increased and inversely a higher service quality indication (e.g., 5) can indicate that communication quality of the communication session may be decreased.

According to an exemplary embodiment, the quality controller component 112 is associated with a communication device as illustrated in FIG. 1 and is configured to change a communication quality of the communication session by performing an action. In one aspect, the signal received from a microphone of the communication device is adjusted. For example, the signal from a microphone can be amplified or attenuated to change communication quality.

In another aspect, the signal sent to a speaker of the communication device can be adjusted, e.g., amplified or attenuated, to change communication quality.

In another aspect, a transmission power of the communication device can be adjusted up or down to change communication quality.

In another aspect, a receiver sensitivity of the communication device can be adjusted more sensitive or less sensitive to change communication quality.

In another aspect, the client 100 can provide for adjusting a transmission power of signals sent to the communication device to change communication quality. For example, a mobile station communicating with a base station can request the base station to increase or decrease transmission power.

In another aspect, the client 100 can provide for a handoff from one communication base station to another for the communication session to change communication quality. For example, a mobile station can indicate to a mobile switching center via the current base station that it wishes to be handed-off to a base station with a stronger signal.

In another aspect, the client 100 can provide for adjusting the quality of service (QoS) for the communication session to change communication quality. For example, the client 100 can indicate to appropriate entities in the network that make the actual determination of priority level should be assigned to the data, such as packets in a packet data network, exchanged for the communication session.

In another aspect, the client 100 can provide for changing communication paths for the communication session to change communication quality. For example, network segments, radio bearers, radio channels, etc. can be changed based on an indication from the client 100.

In another aspect, the client 100 can provide for changing an error correction scheme for the communication session to change communication quality. Changing an error correction scheme to a more robust scheme can result in less errors in the communication session. Changing an error correction scheme to a less robust scheme will generally require less bandwidth for each unit of data, freeing up additional bandwidth for the communication session.

In another aspect, the client 100 can provide for performing an error analysis for the communication session to change communication quality. For example, the client 100 can determine how many errors are received, e.g., based on dropped packets, and provide input to another entity on the network for improving the communication quality.

In another aspect, the client 100 can send an indication to second communication device used in the communication session for changing the communication quality via the second communication device to change communication quality. For example, a message can be sent to the other user/participant in a communication session to inform the other user that the speech quality is poor, thereby enabling the other user to take action. For example, the other user can speak louder or move the mouthpiece closer to their mouth.

Figure 5:
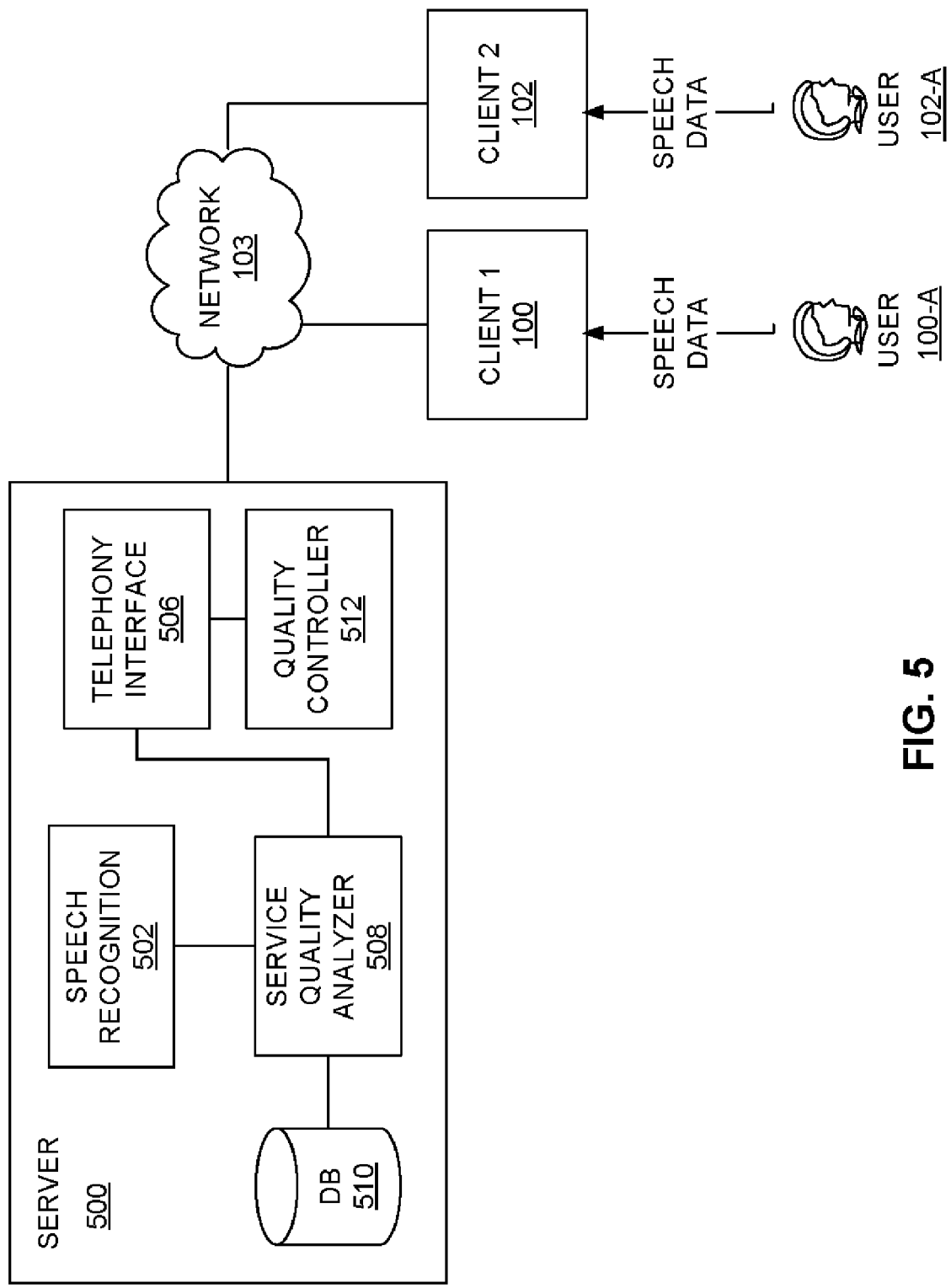
FIG. 5 is a block diagram illustrating a system for changing a communication quality of a communication session based on a meaning of speech data according to another embodiment of the subject matter described.

FIG. 5 is a block diagram illustrating a system for changing a communication quality of a communication session based on a meaning of speech data according to another embodiment of the subject matter described. In FIG. 5, components of the system are associated with a server 500 used for the communication session. A speech recognition component 502, a telephony interface component 506, a service quality analyzer component 508, a data store component 510, and a quality controller component 512, perform functions for the communication session at the server analogous to those described above. In this embodiment, speech recognition is performed on speech data received via the network 103 and already converted into a network-transportable form. Accordingly, spoken words and phrases are detected from the speech data received via network 103. The service quality analyzer component 508 determines a meaning of the speech data for identifying a service quality indicator as described above and the quality controller component 512 changes a quality of the communication session based on the service quality indicator as described above. Note that in this embodiment input may be processed at the server from either or both of client 100 and client 102 for changing a quality of the communication session.

In an exemplary embodiment, the server 500 is configured to change a communication quality of the communication session by performing an action. In one aspect, an indication is sent to a communication device used in the communication session to adjust a signal received from a microphone of the communication device, as described above.

In another aspect, an indication is sent to a communication device used in the communication session to adjust a signal sent to a speaker of the communication device, as described above.

In another aspect, an indication is sent to a communication device used in the communication session to adjust a transmission power of the communication device, as described above.

In another aspect, the server provides for adjusting a transmission power of signals sent to the communication device, as described above.

In another aspect, an indication is sent to a communication device used in the communication session to adjust a receiver sensitivity of the communication device, as described above.

In another aspect, the server provides for a handoff from one communication base station to another for the communication session, as described above.

In another aspect, the server provides for adjusting the quality of service for the communication session, as described above.

In another aspect, the server provides for changing communication paths for the communication session, as described above.

In another aspect, the server provides for performing an error analysis for the communication session, as described above.

In another aspect, the server provides for changing an error correction scheme for the communication session, as described above.

In an alternative embodiment based on the system illustrated in FIG. 1, the clients 100 and 102 are both configured to identify service quality indicators and can share the identified service quality indicators with each other and together negotiate an action to change the communication quality of the communication session.

In an alternative embodiment, analysis may be performed on the communication of the entire communication session. Thus, the speech recognition engine would be coupled with a natural language understanding (NLU) system such that all speech data exchanged between the participants is understood. The NLU converts the contents of the communication into a logical form. The produced logical form may then be analyzed for a service quality indicator. The advantage of this approach is that the system will have a better chance of accurately identifying the correct service quality indicator during the communication session.

In an alternative embodiment, the service quality may be determined by keeping a cumulative score of the service quality indicator of preceding speech data segments. Thus, if speaking effort is determined to be high repeatedly, the effort for the current segment increases. Thus, the score of the service quality indicator of a segment may be calculated based on the current score and an average of the previous few speech data segments. Accordingly, using this technique, the service quality indicators may be identified in the user's speech over the duration of a call and not at a particular point in time.

It should be pointed out that the service quality may be reduced as well as increased based on the service quality indicators. For instance, if the determined meaning of the speech data does not indicate any degradation of the service quality an action may be performed to reduce the service quality.

It should be understood that the various components illustrated in the figures represent logical components that are configured to perform the functionality described herein and may be implemented in software, hardware, or a combination of the two. Moreover, some or all of these logical components may be combined and some may be omitted altogether while still achieving the functionality described herein.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, or transport instructions for use by or in connection with the instruction execution system, apparatus, or device. The computer-readable medium can be, for example but not limited to, an electronic, magnetic, optical, or semiconductor system, apparatus, or device. More specific examples (a non-exhaustive list) of the computer-readable medium can include the following: a portable computer diskette, a random access memory (RAM), a read-only memory (ROM), an erasable programmable read-only memory (EPROM or Flash memory), an optical fiber, a portable compact disc read-only memory (CDROM), a portable digital video disc (DVD) and the like.

Thus, the subject matter described herein can be embodied in many different forms, and all such forms are contemplated to be within the scope of what is claimed.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for changing a communication quality of a communication session based on a meaning of speech data, the method comprising:
   parsing speech data exchanged between clients participating in a communication session;
   determining a meaning of the parsed speech data for identifying a service quality indicator for the communication session; and
   performing an action to change a communication quality of the communication session based on the identified service quality indicator.

2. The method of claim 1 wherein parsing speech data comprises:
   converting a waveform representing the speech data into a spectrogram; and
   analyzing the spectrogram.

3. The method of claim 2 wherein analyzing the spectrogram includes analyzing the spectrogram to determine an intonation value of the speech data.

4. The method of claim 1 wherein parsing speech data includes performing speech recognition on the speech data.

5. The method of claim 1 wherein parsing speech data includes performing statistical analysis on the speech data.

6. The method of claim 5 wherein the statistical analysis includes one of a noise level analysis, a transmission delay determination, and a conversational analysis.

7. The method of claim 6 wherein the conversational analysis includes detecting one of double talk, mutual silence, and interruption.

8. The method of claim 1 wherein determining a meaning of the parsed speech data for identifying a service quality indicator for the communication session includes identifying a phrase from recognized speech for the communication session.

9. The method of claim 8 wherein determining a meaning of the parsed speech data for identifying a service quality indicator for the communication session includes determining a context for the identified phrase based on at least one of a determination of a measurement key point, a statistical analysis performed on the speech data, a determined intonation value for the speech data.

10. The method of claim 1 wherein performing an action to change a communication quality of the communication session includes performing an action by a communication device used in the communication session, wherein the action includes one of:
   adjusting a signal received from a microphone of the communication device;
   adjusting a signal sent to a speaker of the communication device;
   adjusting a transmission power of the communication device;
   adjusting a receiver sensitivity of the communication device;
   providing for adjusting a transmission power of signals sent to the communication device;
   providing for a handoff from one communication base station to another for the communication session;
   providing for adjusting the quality of service for the communication session;
   providing for changing communication paths for the communication session;
   providing for changing an error correction scheme for the communication session;
   providing for performing an error analysis for the communication session; and
   sending an indication to second communication device used in the communication session for changing the communication quality via the second communication device.

11. The method of claim 1 wherein performing an action to change a communication quality of the communication session includes performing an action by a server used in the communication session, wherein the action includes one of:
   sending an indication to a communication device used in the communication session to adjust a signal received from a microphone of the communication device;
   sending an indication to a communication device used in the communication session to adjust a signal sent to a speaker of the communication device;
   sending an indication to a communication device used in the communication session to adjust a transmission power of the communication device;
   providing for adjusting a transmission power of signals sent to the communication device;
   sending an indication to a communication device used in the communication session to adjust a receiver sensitivity of the communication device;
   providing for a handoff from one communication base station to another for the communication session;
   providing for adjusting the quality of service for the communication session;
   providing for changing communication paths for the communication session;
   providing for performing an error analysis for the communication session; and
   providing for changing an error correction scheme for the communication session.

12. A system for changing a communication quality of a communication session based on a meaning of speech data, comprising:
   means for parsing speech data exchanged between clients participating in a communication session;
   means for determining a meaning of the parsed speech data for identifying a service quality indicator for the communication session; and
   means for performing an action to change a communication quality of the communication session based on the identified service quality indicator.

13. A system for changing a communication quality of a communication session based on a meaning of speech data, comprising:
   a parser component for parsing speech data exchanged between clients participating in a communication session;

a service quality analyzer component for determining a meaning of the parsed speech data for identifying a service quality indicator for the communication session; and a quality controller component for performing an action to change a communication quality of the communication session based on the identified service quality indicator.

14. The system of claim 13 wherein the system is associated with a communication client used for the communication session.

15. The system of claim 13 wherein the system is associated with a server used for the communication session.

16. The system of claim 13 wherein the parser component includes a waveform analyzer component configured for converting a waveform representing the speech data into a spectrogram for analysis.

17. The system of claim 16 wherein the parser component includes an intonation analyzer component configured for analyzing the spectrogram to determine an intonation value of the speech data.

18. The system of claim 13 wherein the parser component includes a speech recognizer component configured for performing speech recognition on the speech data.

19. The system of claim 13 wherein the parser component includes a statistical analyzer component configured for performing statistical analysis on the speech data.

20. The system of claim 19 wherein the statistical analysis includes one of a noise level analysis, a transmission delay determination, and a conversational analysis.

21. The system of claim 20 wherein the conversational analysis includes detecting one of double talk, mutual silence, and interruption.

22. The system of claim 13 wherein the service quality analyzer component is configured to determine a meaning of the parsed speech data by identifying a phrase from recognized speech for the communication session.

23. The system of claim 21 wherein the service quality analyzer component is configured to determine a meaning of the parsed speech data by determining a context for the identified phrase based on at least one of a determination of a measurement key point, a statistical analysis performed on the speech data, a determined intonation value for the speech data.

24. The system of claim 21 wherein the service quality analyzer component is configured to use one of a lookup table and a decision tree to identify a service quality indicator in the parsed speech data.

25. The system of claim 14 wherein the quality controller component is associated with a communication device used in the communication session and is configured to change a communication quality of the communication session by one of:

adjusting a signal received from a microphone of the communication device;

adjusting a signal sent to a speaker of the communication device;

adjusting a transmission power of the communication device;

adjusting a receiver sensitivity of the communication device;

providing for adjusting a transmission power of signals sent to the communication device;

providing for a handoff from one communication base station to another for the communication session;

providing for adjusting the quality of service for the communication session;

providing for changing communication paths for the communication session;

providing for changing an error correction scheme for the communication session;

providing for performing an error analysis for the communication session; and sending an indication to second communication device used in the communication session for changing the communication quality via the second communication device.

26. The system of claim 15 wherein the quality controller component is associated with a server used in the communication session and is configured to change a communication quality of the communication session by one of:

sending an indication to a communication device used in the communication session to adjust a signal received from a microphone of the communication device;

sending an indication to a communication device used in the communication session to adjust a signal sent to a speaker of the communication device;

sending an indication to a communication device used in the communication session to adjust a transmission power of the communication device;

providing for adjusting a transmission power of signals sent to the communication device;

sending an indication to a communication device used in the communication session to adjust a receiver sensitivity of the communication device;

providing for a handoff from one communication base station to another for the communication session;

providing for adjusting the quality of service for the communication session;

providing for changing communication paths for the communication session;

providing for performing an error analysis for the communication session; and providing for changing an error correction scheme for the communication session.

27. A non-transitory computer readable medium including a computer program, executable by a machine, for changing a communication quality of a communication session based on a meaning of speech data, the computer program comprising executable instructions for:

parsing speech data exchanged between clients participating in a communication session;

determining a meaning of the parsed speech data for identifying a service quality indicator for the communication session; and performing an action to change a communication quality of the communication session based on the identified service quality indicator.

* * * * *